(12) United States Patent
Koch et al.

(10) Patent No.: US 9,626,709 B2
(45) Date of Patent: Apr. 18, 2017

(54) IN-STORE FIELD-OF-VIEW MERCHANDISING AND ANALYTICS

(71) Applicant: AT&T Intellectual Property I, L.P., Atlanta, GA (US)

(72) Inventors: Robert Alan Koch, Norcross, GA (US); Ari Craine, Marietta, GA (US); James Carlton Bedingfield, Sr., Gainesville, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 529 days.

(21) Appl. No.: 14/254,042

(22) Filed: Apr. 16, 2014

(65) Prior Publication Data

US 2015/0302500 A1 Oct. 22, 2015

(51) Int. Cl.
*G06Q 30/06* (2012.01)
*G06Q 30/02* (2012.01)
*G06K 9/00* (2006.01)
*G06F 17/30* (2006.01)

(52) U.S. Cl.
CPC ......... *G06Q 30/0623* (2013.01); *G06F 17/30* (2013.01); *G06K 9/00671* (2013.01); *G06Q 30/0639* (2013.01); *G06Q 30/0242* (2013.01)

(58) Field of Classification Search
None
See application file for complete search history.

(56) References Cited

U.S. PATENT DOCUMENTS

| | | | |
|---|---|---|---|
| 6,624,757 B1 | 9/2003 | Johnson | |
| 6,803,887 B1 * | 10/2004 | Lauper | G06F 3/013 345/7 |
| 7,372,451 B2 | 5/2008 | Dempski | |
| 8,335,524 B2 | 12/2012 | Shutter | |
| 8,442,500 B2 | 5/2013 | Gupta et al. | |
| 8,457,354 B1 * | 6/2013 | Kolar | G06K 9/00677 348/143 |
| 8,467,991 B2 | 6/2013 | Khosravy et al. | |
| 8,550,903 B2 * | 10/2013 | Lyons | G07F 17/3241 463/25 |

(Continued)

OTHER PUBLICATIONS

Zalud, B., "Monitoring Goes Beyond Camera Images," Security 49.8 (Aug. 2012) 46, 48, 50.*

(Continued)

*Primary Examiner* — Nicholas D Rosen
(74) *Attorney, Agent, or Firm* — Hartman & Citrin LLC

(57) ABSTRACT

Concepts and technologies disclosed herein are directed to aspects of in-store field-of-view merchandising and analytics. According to one aspect disclosed herein, a system receives a message from a user device. The message can include an orientation of the user device and a location of the user device within an environment, such as a store. The system can obtain a potential field-of-view of a user associated with the user device. The system can determine, based upon the orientation, the location of the user device and the potential field-of-view of the user, an estimated field-of-view of the user. The system can query a database to look-up items located within the estimated field-of-view. The system can receive, in response to the query, a query response identifying an item located within the estimated field-of-view of the user within the environment.

20 Claims, 9 Drawing Sheets

(56) References Cited

U.S. PATENT DOCUMENTS

| | | | |
|---|---|---|---|
| 8,639,440 B2* | 1/2014 | Nicholson | G01C 21/00 701/400 |
| 8,666,790 B2* | 3/2014 | Sorensen | G06Q 30/02 705/7.11 |
| 9,081,994 B2* | 7/2015 | Zumsteg | G06K 7/10099 |
| 9,204,257 B1* | 12/2015 | Mendelson | G08G 1/14 |
| 9,269,219 B2* | 2/2016 | Lyons | G07F 17/3211 |
| 9,392,414 B2* | 7/2016 | Schillings | H04W 4/026 |
| 9,424,598 B1* | 8/2016 | Kraft | G06Q 30/0627 |
| 2004/0183751 A1* | 9/2004 | Dempski | G02B 27/017 345/8 |
| 2008/0074264 A1 | 3/2008 | Sharpe et al. | |
| 2008/0153513 A1 | 6/2008 | Flake et al. | |
| 2008/0232641 A1 | 9/2008 | Borger et al. | |
| 2009/0271251 A1 | 10/2009 | Sorensen et al. | |
| 2011/0143779 A1 | 6/2011 | Rowe et al. | |
| 2011/0161136 A1 | 6/2011 | Faith et al. | |
| 2011/0246064 A1* | 10/2011 | Nicholson | G01C 21/00 701/467 |
| 2012/0016747 A1 | 1/2012 | Pan | |
| 2012/0122558 A1* | 5/2012 | Lyons | G07F 17/3241 463/25 |
| 2012/0239504 A1 | 9/2012 | Curlander et al. | |
| 2013/0073988 A1 | 3/2013 | Groten et al. | |
| 2013/0101163 A1 | 4/2013 | Gupta et al. | |
| 2013/0187952 A1* | 7/2013 | Berkovich | G01S 5/16 345/633 |
| 2013/0238234 A1 | 9/2013 | Chao et al. | |
| 2013/0281208 A1* | 10/2013 | Lyons | G07F 17/3211 463/33 |
| 2013/0286048 A1 | 10/2013 | Sternitzke | |
| 2014/0002644 A1 | 1/2014 | Fedorovskaya et al. | |
| 2014/0097247 A1* | 4/2014 | Zumsteg | G06K 7/10099 235/440 |
| 2014/0172555 A1* | 6/2014 | Argue | G06Q 30/0633 705/14.49 |
| 2014/0214623 A1* | 7/2014 | Cancro | G06Q 30/0623 705/26.63 |
| 2014/0310056 A1* | 10/2014 | Alapati | G06Q 50/01 705/7.28 |
| 2015/0189475 A1* | 7/2015 | Schillings | H04W 4/026 455/456.1 |

OTHER PUBLICATIONS

Anon., "RetailNext Launches Suite of marketing-Focused Analytics Products for Brick-and-Mortar Retailers," Progressive Digital Media Retail News, Jan. 14, 2014.*

Kim, Byoungjip, et al. "Adnext: a visit-pattern-aware mobile advertising system for urban commercial complexes." Proceedings of the 12th Workshop on Mobile Computing Systems and Applications. ACM, 2011.

Zhu, Wei, et al. "Personalized in-store e-commerce with the promopad: an augmented reality shopping assistant." Electronic Journal for E-commerce Tools and Applications 1.3 (2004): 1-19.

"The Incredibly Shrinking (In-Store) "Audience"", retrieved from http://www.insidethemindoftheshopper.com/2014-02-24.html on Apr. 16, 2014.

* cited by examiner

IN-STORE FIELD-OF-VIEW MERCHANDISING AND ANALYTICS

BACKGROUND

Mobile computing devices such as smartphones and tablet computers have become an integral part of many people's lives. Many people use these devices as an aid for researching, comparing and purchasing products online as well as in physical stores. In fact, some reports indicate that up to 84% of smartphone shoppers utilize their smartphones while in a physical store to, among other things, research product specifications, compare prices and read reviews.

Some application developers have created device applications that leverage augmented reality techniques to further enhance user experiences. Augmented reality techniques utilize a camera to present a live view of a scene and augment the scene with additional information. For example, a navigation application that leverages augmented reality technology may present a live view of a street scene and augment the street scene with address information, directions and/or other navigation information as an overlay to the live images captured by the camera. Other augmented reality applications exist, including some that allow shoppers to get additional information regarding products within a store.

Although augmented reality provides a fun and useful tool for users to receive information in a real-world context, many users find it can be cumbersome to hold up their device to view the live scene captured by the camera and the contextual information that augments the live scene. This may result in many users fleeting use of augmented reality applications. Without augmented reality, however, a user's field-of-view, as approximated through the device camera, is lost and information that might be contextually relevant becomes more difficult to ascertain and present to the user.

SUMMARY

Concepts and technologies disclosed herein are directed to aspects of in-store field-of-view merchandising and analytics. According to one aspect disclosed herein, a system receives a message from a user device. The message can include an orientation of the user device and a location of the user device within an environment, such as a store. The system can obtain a potential field-of-view of a user associated with the user device. The system can determine, based upon the orientation and the location of the user device and the potential field-of-view of the user, an estimated field-of-view of the user. The system can query a database to look-up items located within the estimated field-of-view. The system can receive, in response to the query, a query response identifying an item located within the estimated field-of-view of the user within the environment.

In some embodiments, the system can notify a store analytics system of the item located within the estimated field-of-view of the user within the environment. In some embodiments, the store analytics system can utilize information regarding the item located within the estimated field-of-view of the user within the environment to perform an aggregate analysis of a plurality of customers of the environment to determine what items the plurality of customers are viewing within the environment, how long the plurality of customers are viewing the items within the environment, or an effectiveness of an advertisement associated with the items within the environment. In some other embodiments, the store analytics system can determine information associated with the item located within the estimated field-of-view of the user within the environment and can send the information associated with the item located within the estimated field-of-view of the user within the environment to the user device. In some other embodiments, the store analytics system can establish communications with the user device over a network so that customer service personnel can offer to assist the user with the item.

In some embodiments, the message also includes the potential field-of-view and the system obtains the potential field-of-view from the message. In some other embodiments, the system obtains the potential field-of-view form the database.

The potential field-of-view can be a default potential field-of-view. The default potential field-of-view can be defined as a normal visual field. In some embodiments, the normal visual field is defined in accordance with optometry and ophthalmology standards for the normal human visual field, and as such, may be updated from time-to-time. For example, the normal human visual field is defined as an island of vision measuring 90 degrees temporally to central fixation, 50 degrees superiorly and nasally, and 60 degrees inferiorly. Likewise, an abnormal field of vision may be defined as a depression or absence of vision anywhere in the island of vision. The user may select the default potential field-of-view if he or she knows, based upon a vision assessment, that his or her visual field is normal.

The potential field-of-view can be a custom potential field-of-view. The custom potential field-of-view can be determined based upon results of a visual field test administered to the user. The visual field test, in some embodiments, is a standardized visual field test utilized by optometrists and ophthalmologists to determine a patient's visual field that has been optimized for use on the user device. For example, the visual field test may utilize a software-based multi-fixation campimeter, such as a version of the Damato Multi-Fixation Campimeter available from www.testvision.org. In some embodiments, the visual field test is included as part of an application that can be executed by one or more processors of the user device. In some other embodiments, the visual field test is available via a website accessible by a web browser installed on the user device. In some other embodiments, the visual field test is available via a web application accessible by the web browser.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

Other systems, methods, and/or computer program products according to embodiments will be or become apparent to one with skill in the art upon review of the following drawings and detailed description. It is intended that all such additional systems, methods, and/or computer program products be included within this description, be within the scope of this disclosure.

DETAILED DESCRIPTION

The following detailed description is directed to in-store field-of-view merchandising and analytics. More specifically, the following detailed description is directed to determining a user's location and estimating the user's field-of-view within a store to provide valuable information to a store owner and/or operator as well as vendors who sell products in the store. By having information regarding what customers, individually or in aggregate, are looking at, and for how long, the store owner and/or operator can gather valuable information regarding how to interact with a customer, what shopping patterns customers display, and what items and/or advertisements benefit from being near popular products. This information and conclusions that may be drawn from this information can allow the store owner and/or operator to improve customer and vendor relationships.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Figure 1:
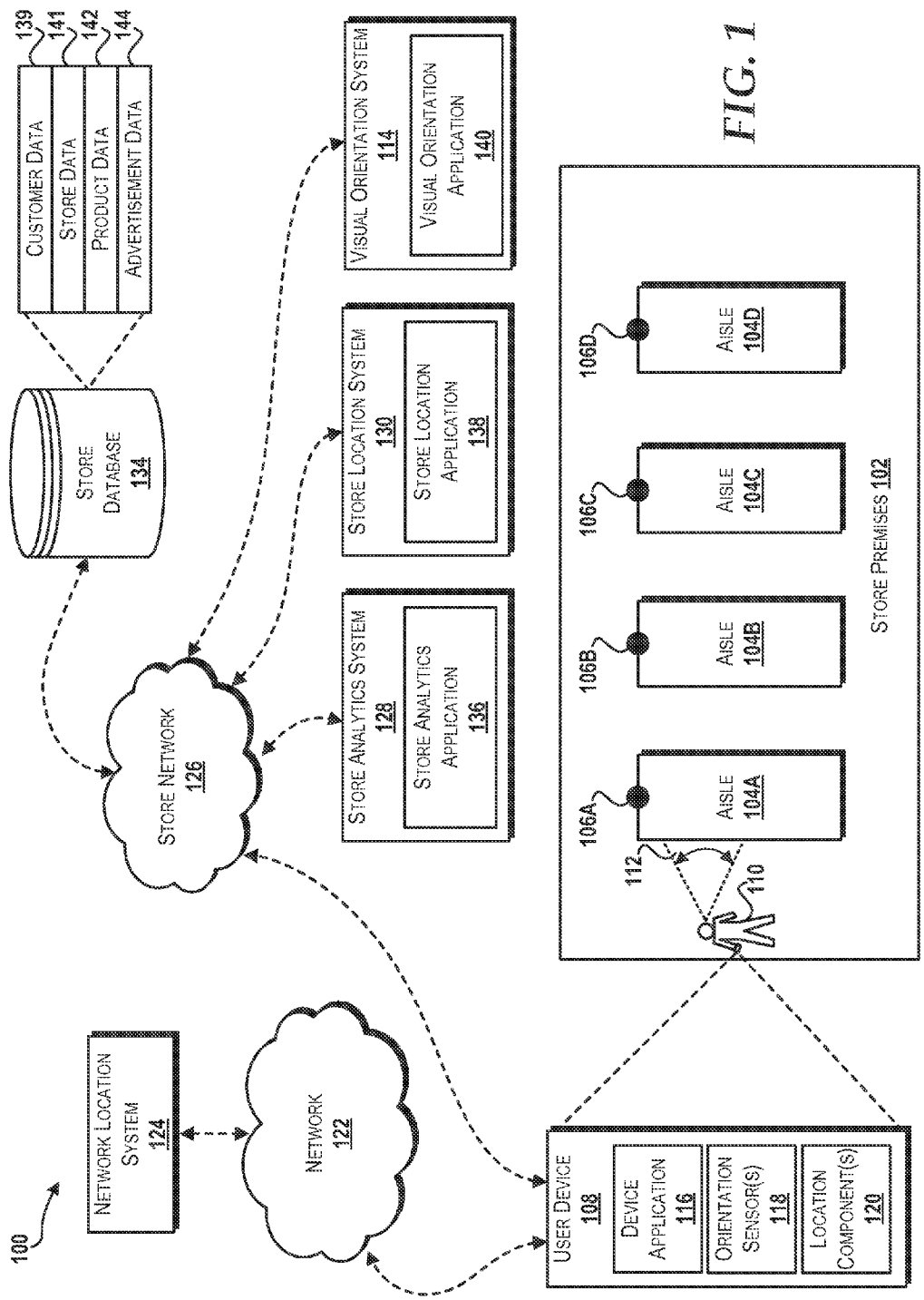
FIG. 1 is a system diagram illustrating an illustrative operating environment for the various embodiments disclosed herein.

Referring now to FIG. 1, aspects of an operating environment 100 for various embodiments of the concepts and technologies disclosed herein will be described. The operating environment 100 shown in FIG. 1 includes a store premises 102 that includes a plurality of aisles 104A-104D in which a plurality of items (not shown) are located. Each of the plurality of aisles 104A-104D is associated with a corresponding one of a plurality of location beacons 106A-106D. The plurality of location beacons 106A-106D can be utilized by a user device 108 associated with a user 110 to determine a location of the user device 108, and thus the user 110, within the store premises 102. Furthermore, the user 110 is shown viewing a portion of the aisle 104A, as represented by an actual field-of-view 112 of the user 110. The actual field-of-view 112 of the user 110 may include one or more items located on one or more shelves within the aisle 104A. As will be described in greater detail below, the actual field-of-view 112 of the user 110 can be estimated by a visual orientation system 114 using orientation and location data provided, in some embodiments, by a device application 116 executing on the user device 108. The device application 116 can obtain the orientation data from one or more orientation sensors 118. The device application 116 can obtain the location data from one or more location components 120. The device application 116, in some embodiments, provides privacy settings that allow the user 110 to opt-in to or opt-out of one or more features described herein that utilize, for example, a location, orientation, shopping history, personal information, or other information associated with the user 110.

The store premises 102 is described by way of example herein as a store having a plurality of aisles 104A-104D each with shelves for displaying products and other items. In some embodiments, products and/or other items may be tagged with static or dynamic pricing displays, the latter of which may display pricing that is particular to the user 110. By way of example, the store premises 102 may be a home improvement store or a grocery store. These examples are provided merely to aid in describing the concepts and technologies disclosed herein. It should be understood that the store premises 102 alternatively may include any environment in which the field-of-view of a given user is useful. Some example environments include, but are not limited to, outdoor environments, stadiums, tents and other temporary structures, houses and other residential environments, parking garages, commercial buildings, nature trails, outdoor sales events, festivals, concerts, other non-retail environments, and the like.

The user device 108, in some embodiments, is a mobile device such as, for example, a smartphone, a tablet device, a personal digital assistant, a laptop computer, or the like. The user device 108, in some other embodiments, is a wearable device such as, for example, a smart watch, smart glasses, smart jewelry, fitness accessories, or the like. In some other embodiments, the user device 108 is an implanted device that is implanted within the user 110. In some other embodiments, the user device 108 is an electronic tattoo. The electronic tattoo may be an epidermal electronic sensing ("EES") device that attaches to the skin of the user 110 and contains an array of electronic components for performing various operations of the user device 108 described herein. In some other embodiments, the user device 108 is built-in to a shopping cart, shopping basket or the like and can be associated with the user 110 upon entry, at check out, or via other mechanisms.

The user device 108, in some embodiments, is in communication with a secondary device, which may be a mobile device, a wearable device, an implanted device, or an electronic tattoo. Communication between the user device 108 and the secondary device can be facilitated by a short-range communications technologies such as, for example, BLUETOOTH, BLUETOOTH low energy ("BLE"), infrared, infrared data association ("IRDA"), near field communications ("NFC"), other RF technologies, or the like. Communication between the user device 108 and the secondary device can be facilitated by WI-FI, other wireless technologies, or wired technologies.

The user device 108, in the illustrated example, is operating in communication with and/or as part of a communications network ("network") 122. The network 122 can include one or more wireless local area networks ("WLANs"), one or more wireless wide area networks ("WWANS"), one or more wireless metropolitan area networks ("WMANs"), one or more campus area networks ("CANs"), and/or one or more packet data networks (e.g., the Internet). The user device 108 can communicate with the network 122 using any wireless communications technology or combination of wireless communications technologies, some examples of which include, but are not limited to, WI-FI, Global System for Mobile communications ("GSM"), Code Division Multiple Access ("CDMA") ONE, CDMA2000, Universal Mobile Telecommunications System ("UMTS"), Long-Term Evolution ("LTE"), Worldwide Interoperability for Microwave Access ("WiMAX"), other Institute of Electrical and Electronics Engineers ("IEEE") 802.XX technologies, and the like. The user device 108 can communicate with the network 122 via various channel access methods (which may or may not be used by the aforementioned technologies), including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Single-Carrier FDMA ("SC-FDMA"), Space Division Multiple Access ("SDMA"), and the like. Data can be exchanged between the user device 108 and the network 122 via cellular data technologies such as, but not limited to, General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and/or various other current and future wireless data access technologies. It should be understood that the network 122 may additionally include infrastructure that operates on wired communications technologies, including, but not limited to, optical fiber, coaxial cable, twisted pair cable, and the like to transfer data between various systems operating on or in communication with the network 122. Additional details regarding an illustrative example of the network 122 is illustrated and described with reference to FIG. 8.

The network 122 is illustrated as being in communication with a network location system 124. The network location system 124 can provide to the user device 108 location information associated with a location of the user device 108 by leveraging one or more network-based location determining techniques, such as, but not limited to, cellular triangulation, WI-FI triangulation, cell ID, forward link timing, or some combination thereof.

The location of the user device 108 alternatively or additionally can be determined by the location component(s) 120. In some embodiments, the location component(s) 120 include a global positioning system ("GPS") component. In some other embodiments, the location component(s) 120 include a short-range communications component that can communicate with one or more of the plurality of location beacons 106A-106D to determine the location of the user device 108 within the store premises 102. In these embodiments, the short-range communications component can utilize BLUETOOTH, BLE, infrared, IRDA, NFC, other RF technologies, other light-based technologies, combinations thereof, and the like to communicate with one or more of the plurality of location beacons 106A-106D to determine the location of the user device 108 within the store premises 102. Other technologies, including quick response codes, barcodes, three-dimensional barcodes, and the like may be used by the user device 108 to establish location within the store premises 102.

The user device 108, in the illustrated example, is additionally operating in communication with and/or as part of a store communications network ("store network") 126. The store network 126 can include one or more wireless LANs and may additionally include one or more wired LANs. In some embodiments, the store network 126 includes one or more wireless access points (not shown) that operate in accordance with IEEE 802.11X specifications to provide the user device 108 wireless connectivity to the store network 126 through which the user device 108 can communicate with a store analytics system 128, a store location system 130, the visual orientation system 114, and a store database 134. The store analytics system 128, the store location system 130, the visual orientation system 114, and the store database 134 can communicate with each other via the store network 126.

The illustrated store analytics system 128 includes a store analytics application 136. The store analytics application 136 can be stored in a memory or other storage component (best shown in FIG. 7) of the store analytics system 128 and can be executed by one or more processors (also best shown in FIG. 7) of the store analytics system 128 to perform various operations described herein. For example, execution of the store analytics application 136 can cause the store analytics system 128 to interact with the user device 108, the store network 126, the store database 134, the store location system 130, and/or the visual orientation system 114. Some operations performed by the store analytics system 128 will be described immediately below, and others will become apparent from the other FIGURES described herein.

The store analytics application 136 can be executed by one or more processors of the store analytics system 128 to perform operations, such as, for example, measuring, collecting, analyzing, and reporting data associated with the store premises 102, products for sale within the store premises 102, advertisements within the store premises 102, and customers, such as the user 110, of the store premises 102. This data can include, for example, customer data 139, store data 141, product data 142, and advertisement data 144 as shown in the store database 134. The store analytics system 128 can save data to the store database 134, retrieve data from the store database 134, delete data from the store database 134, edit data and saved edited data to the store database 134, and manipulate data stored within the store database 134.

The customer data 139 can include data associated with one or more customers such as the user 110. For example, the customer data 139 can include identity data such as name, birth date, gender, one or more physical addresses, one or more telephone numbers, one or more email addresses, social network information, customer account information including account identifiers and/or user identifiers, and/or job information. The customer data 139 can additionally or alternatively include quantitative data, such as, for example, transactional information such as the number of products purchased, details regarding the products purchases, value of products purchased, and product return history; communication information such as communication date, communication channel (e.g., telephone, email or social network) and communication subject; online activity such as website visits, product views, online registration information, and social network activity including posts, likes, and other social network interactions; and customer service information such as customer complaint details and customer inquiry details. The customer data 139 can additionally or alternatively include descriptive data, such as, for example, marital status, number of children, age of children, property type, car type, number of car doors, number and type of pets, annual income, profession, education level, and the like. The customer data 139 can additionally or alternatively include qualitative data, such as, for example, attitudinal information regarding how customers rate customer service, the value of a product, and the likelihood of purchasing a product again; opinion information regarding customer's favorite colors, favorite vacation locations, and other personal opinions; and motional information regarding why a product was purchased (e.g., personal use, business use or as a gift), one or more reasons for purchasing a product (e.g., locality, brand, price, and/or quality). The customer data also can include permission and suppression preferences. It should be understood that the customer data 139 can include any combination of the aforementioned data and other data associated with customer that is not specified herein.

The store data 141 can include data associated with various aspects of the store premises 102. For example, the store data 141 can include dimensions of the store premises 102, a layout of the store premises 102, the location of each of the plurality of aisles 104A-104D and/or other areas (e.g., departments, restrooms, customer service, cashiers, and the like) within the store premises 102, and the location of each of the plurality of location beacons 106A-106D. It should be understood that the store data 141 can include any combination of the aforementioned data and other data associated with the store premises 102 that is not specified herein.

The product data 142 can include data associated with one or more products available for purchase within the store premises 102. The product data 142 can include, for example, category, title, description, image, uniform resource locator ("URL") for a corresponding web page on a website associated with the store premises 102, stock keeping unit ("SKU"), universal product code ("UPC"), shelf-life, wholesale price, retail price, location within the store premises 102, quantity-on-hand, quantity-on-order, and backorder status. It should be understood that the product data 142 can include any combination of the aforementioned data and other data associated with products that is not specified herein.

The advertisement data 144 can include data associated with one or more advertisements on display, previously on display or scheduled to be on display within the store premises 102. The advertisement data 144 can include identifiers that map to products for which data is stored as part of the product data 142 and for which one or more advertisements are available. The advertisement data 144 can additionally include advertisement category, advertisement title, advertisement description, advertisement price, advertisement restrictions, advertisement start date, and/or advertisement expiration date. It should be understood that the advertisement data 144 can include any combination of the aforementioned data and other data associated with products that is not specified herein.

It is contemplated that the store database 134 can store other data that does not fall into one or more of the aforementioned data categories. As such, the inclusion of the aforementioned data categories in the store database 134 should not be construed as being limiting in any way.

The store location system 130 includes a store location application 138. The store location application 138 can be stored in a memory or other storage component (best shown in FIG. 7) of the store location system 130 and can be executed by one or more processors (also best shown in FIG. 7) of the store location system 130 to perform various operations described herein. For example, execution of the store location application 138 can cause the store location system 130 to communicate with one or more of the plurality of location beacons 106A-106D to determine a location of the user device 108, and in this manner also the user 110, within the store premises 102. The store location system 130 alternatively or additionally can rely on network information from the store network 126 to triangulate the location of the user device 108. Other indoor location determining techniques may be utilized to determine the location of the user device 108 within the store premises 102.

The visual orientation system 114 includes a visual orientation application 140. The visual orientation application 140 can be stored in a memory or other storage component (best shown in FIG. 7) of the visual orientation system 114 and can be executed by one or more processors (also best shown in FIG. 7) of visual orientation system 114 to perform various operations described herein. For example, execution of the visual orientation application 140 can cause the visual orientation system 114 to determine an estimated field-of-view of the user 110 based upon an orientation and a location of the user device 108 at a given time, as will be described in greater detail herein below with reference to FIG. 3.

Figure 2:
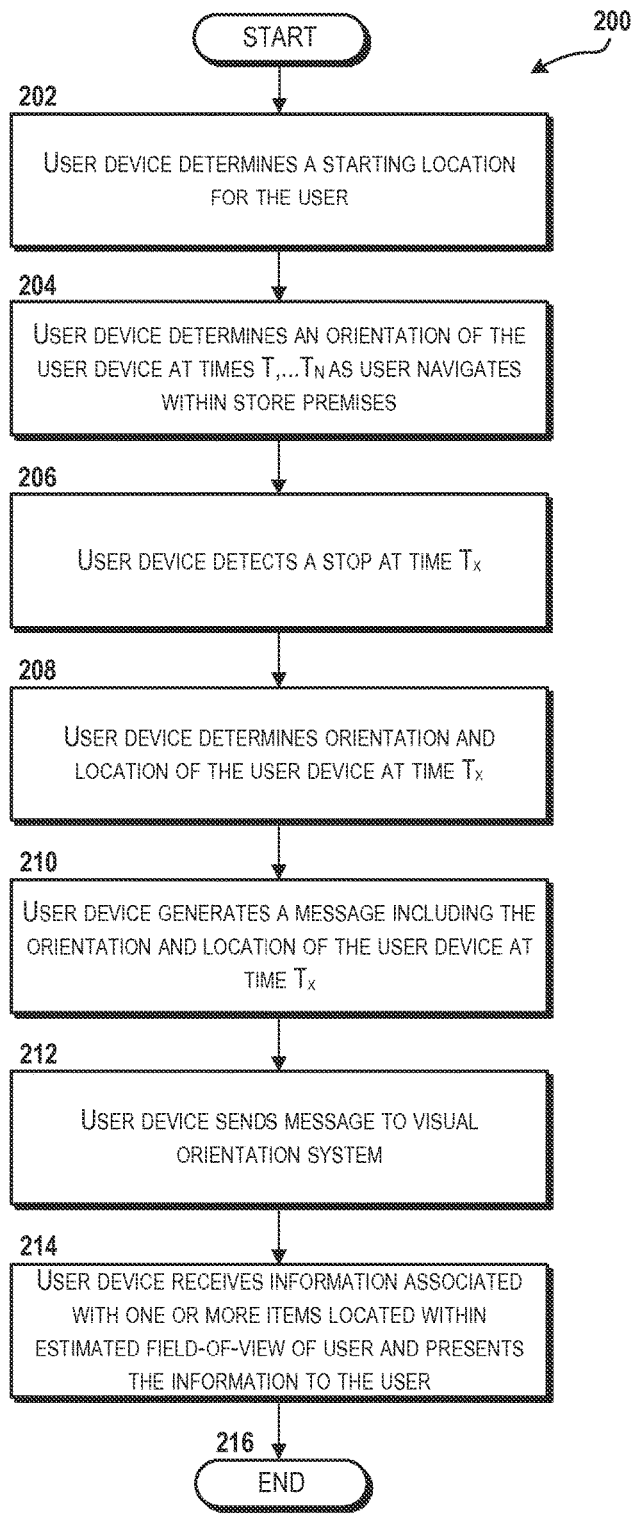
FIG. 2 is a flow diagram illustrating aspects of a method for determining an estimated field-of-view of a user from the perspective of a user device, according to an illustrative embodiment.

Turning now to FIG. 2, a method 200 for determining an estimated field-of-view of the user 110 from the perspective of the user device 108 will be described, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, such as, for example, the plurality of beacons 106A-106D, the user device 108, the network location system 124, the store analytics system 128, the store location system 130, or the visual orientation system 114 to perform one or more operations and/or causing the processor to direct other components of the computing system or device to perform one or more of the operations.

For purposes of illustrating and describing the concepts of the present disclosure, operations of the methods disclosed herein are described as being performed by the user device 108, the network location system 124, the store analytics system 128, the store location system 130, the visual orientation system 114, or the store database 134 alone or in combination via execution of one or more software modules such as, for example, the device application 116, the store analytics application 136, the store location application 138, the visual orientation application 140, and/or other software/firmware components described herein. It should be understood that additional and/or alternative devices and/or network nodes can provide the functionality described herein via execution of one or more modules, applications, and/or other software. Thus, the illustrated embodiments are illustrative, and should not be viewed as being limiting in any way.

The method 200 will be described as being performed by the user device 108 with reference to FIGS. 1 and 2. The method 200 begins and proceeds to operation 202, where the user device 108 determines a starting location for the user 110 based upon the location of the user device 108. In some embodiments, the location component 120, embodied as a GPS component, acquires a GPS fix for the user device 108. In some embodiments, the location component 120, embodied as a short-range communications component, acquires location information from one or more of the plurality of beacons 106A-106D. In these embodiments, the location information may identify the location of one or more of the plurality of beacons 106A-106D, or alternatively the location information may be used by the user device 108 in a query to the store location system 130 to acquire the location of the user device 108. In some other embodiments, the user device 108 receives location information directly from the store location system 130, which may determine the location of the user device 108 via WI-FI triangulation and/or beacon triangulation techniques, for example. In some other embodiments, the user device 108 receives location information from the network location system 124.

From operation 202, the method 200 proceeds to operation 204, where the user device 108 determines an orientation of the user device 108 at various times. More particularly, the orientation sensor(s) 118, embodied as a gyroscope, an accelerometer, a compass, a gyrocompass, and/or the like, for example, can determine the orientation of the user device 108 and the direction of movement of the user device 108 as the user 110 navigates through the store premises 102. As the user 110 navigates through the store premises 102, the device application 116 can request sensor output from the orientation sensor(s) 118 at times $T_1 \ldots T_n$. The sensor output can be used by the device application 116 to determine the orientation of the user device 108 at times $T_1 \ldots T_n$.

In addition, or in the alternative, the orientation of the user device 108 can be determined based upon parameters such as, but not limited to, gait, pace, speed, and/or direction of the user 110 as measured by the user device 108. For example, a person walking down an aisle may exhibit different motion characteristics than a person stepping sideways in front of a display, or stepping up a stair, or walking up a ramp, or pushing a cart. Such motion characteristics can help confirm a person's rotational position relative to the user device 108. After a person's rotational position relative to the user device 108 is ascertained, the orientation sensor(s) 118 in the user device 108 can be used to determine changes.

From operation 204, the method 200 proceeds to operation 206, where the user device 108 uses the orientation sensor(s) 118 to detect that the user device 108 has stopped at time $T_x$. For example, an accelerometer output may indicate no movement or movement below a pre-defined movement threshold that is indicative of the user device 108 being stopped. From operation 206, the method 200 proceeds to operation 208, where the user device 108 determines an orientation of the user device 108 at time $T_x$. In particular, the device application 116 can request sensor output from a gyroscope of the orientation sensor(s) 118 at time $T_x$. Additionally, at operation 206, the user device 108 determines the location of the user device 108 at time $T_x$. In some embodiments, the location component 120, embodied as a GPS component, acquires a GPS fix for the user device 108. In some embodiments, the location component 120, embodied as a short-range communications component, acquires location information from one or more of the plurality of beacons 106A-106D. In these embodiments, the location information may identify the location of one or more of the plurality of beacons 106A-106D, or alternatively the location information may be used by the user device 108 in a query to the store location system 130 to acquire the location of the user device 108. In some other embodiments, the user device 108 receives location information directly from the store location system 130, which may determine the location of the user device 108 via WI-FI triangulation and/or beacon triangulation techniques, for example. In some other embodiments, the user device 108 receives location information from the network location system 124. In some other embodiments, the user device 108 uses the starting location determined at operation 202 and data obtained from the orientation sensor(s) 118 to estimate the distance traveled by the user 110 from the starting location.

From operation 208, the method 200 proceeds to operation 210, where the user device 108 generates a message. The message can include the orientation of the user device 108 and the location of the user device 108 at time $T_x$ as determined at operation 206. From operation 210, the method 200 proceeds to operation 212, where the user device 108 sends the message to the visual orientation system 114. In response, at operation 214, the user device 108 receives information associated with one or more items that are located within an estimated field-of-view of the user 110 and presents the information to the user 110 via a display, speakers or other output component (not shown) of the user device 108. The visual orientation system 114 can determine the estimated field-of-view of the user 110 within varying accuracy to the actual field-of-view 112 of the user 110.

In some embodiments, the information includes additional information about the item(s) estimated by the visual orientation system 114 to be within the actual field-of-view 112 of the user 110. The additional information can include, for example, any of the product data 142 associated with the item(s) estimated by the visual orientation system 114 to be within the actual field-of-view 112 of the user 110. In addition, or in the alternative, the additional information can include, for example, any of the advertisement data 144 associated with the item(s) estimated by the visual orientation system 114 to be within the actual field-of-view 112 of the user 110.

In some other embodiments, the information includes customer service information regarding the item(s) estimated by the visual orientation system 114 to be within the actual field-of-view 112 of the user 110. In this manner, customer service personnel can offer, via text, audio and/or video communications established via the store network 126, to assist the user 110 with the item(s) estimated by the visual orientation system 114 to be within the actual field-of-view 112 of the user 110. The customer service personnel may be real or virtual. The customer service personnel may be located within the store premises 102 or remote. Additional details regarding interactions between customer service personnel and the user 110 will be described below with reference to FIG. 9.

The estimated field-of-view is determined by the visual orientation system 114 as will be described in greater detail below with reference to FIG. 3. The estimated field-of-view can be utilized by the store analytics system 128 to determine one or more items that are estimated to be visible to the user 110. Over time through the analysis of estimated fields-of-view of a plurality of customers navigating through the store premises 102, the store analytics system 128 can determine what items customers are viewing, how long customers are viewing those items, and whether advertisements for customers translated into sales, among other metrics that may be useable by an owner and/or operator of the store premises 102, an item manufacturer, an item distributor, an item advertiser, and/or other entities. Metrics such as those described above may be used by an owner and/or operator of the store premises 102, an item manufacturer, an item distributor, an item advertiser, and/or other entities for item placement decisions, marketing strategies, events, sales performance analysis, and other uses. It is contemplated that metrics from the store premises 102 can be aggregated with metrics from one or more additional stores. This aggregate data can be analyzed to determine which stores are performing better with respect to specific product visibility and/or advertisement effectiveness. Metrics from the store premises 102 and/or additional stores may be presented via a software dashboard so that provides a real-time data view and/or a historical data view to determine how many customers view a particular product or advertisement within a particular time period such as now, this week, last week, last month, the last year, or any other time period, which may be pre-defined or defined on-the-fly.

In some other embodiments, the information includes recalled information. Recalled information can include any information previously presented to the user 110 when the current estimated field-of-view matches a previous estimated field-of-view. A match may be an exact match or an approximated match. In some embodiments, the recalled information provides the user 110 with information associated with the previous estimated field-of-view and may be compared to information associated with the current estimated field-of-view. In this manner, the user 110 can be presented with information reminiscent of past and present for a particular field-of-view. The past information may contain information not previously presented to the user 110 but derived from a common database. The common database may be or may include data such as stored in the store database 134, or the common database may be an image or video of the user's 110 estimated field-of-view from some time in the past. The latter may be useful for a number of types of applications, such as to show a product distributor what their shelf placement used to look like before an improvement and then after. Or, in a different manner, the view of a past version of a predicted field-of-view may enable a user 110 to view what an external environment looked like at some time in the past, for instance, to compare an external environment before and after the completion of a construction project.

From operation 214, the method 200 proceeds to operation 216. The method 200 ends at operation 216.

In some embodiments, the orientation, location, and/or field-of-view can be validated by the user 110 through the device application 116. For example, the device application 116 may elicit a response from the user 110 to a coupon, discount offer, promotion, or other prompt to validate the orientation, location, and/or field-of-view of the user 110.

Figure 3:
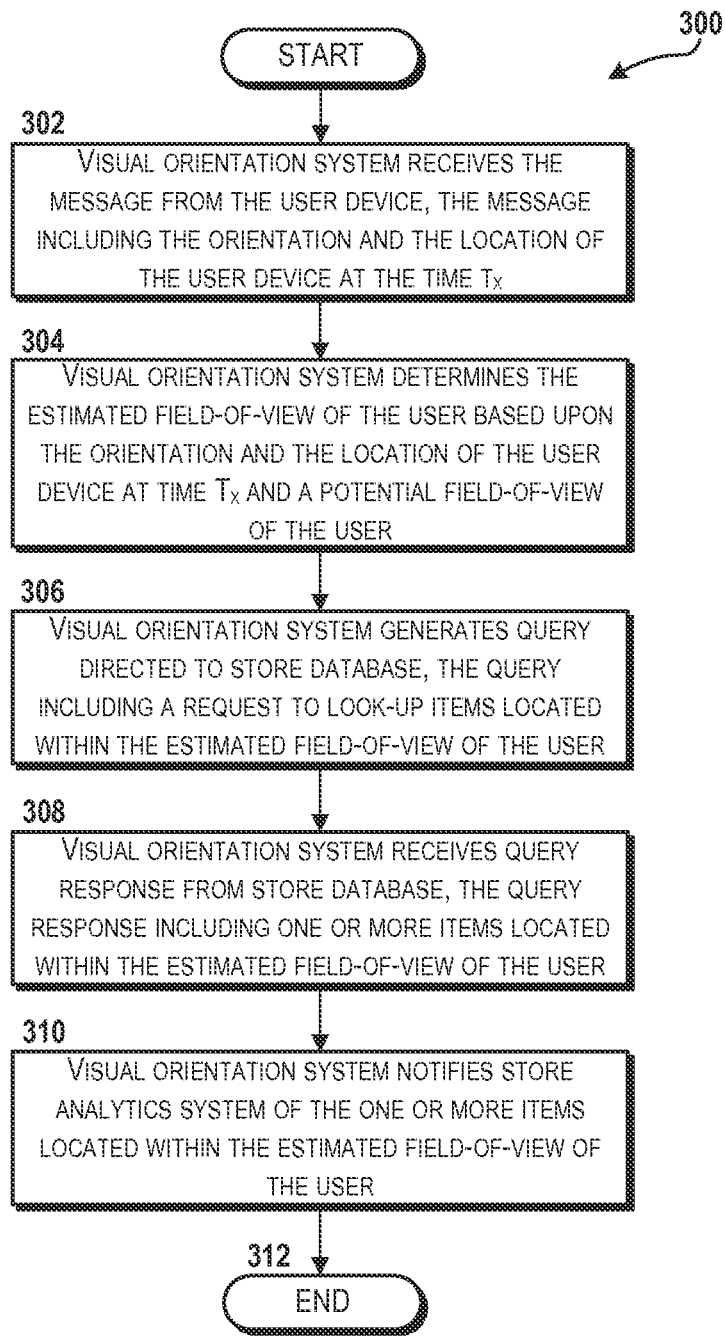
FIG. 3 is a flow diagram illustrating aspects of a method for determining an estimated field-of-view of a user from the perspective of a visual orientation system, according to an illustrative embodiment.

Turning now to FIG. 3, a method 300 for determining an estimated field-of-view of the user 110 from the perspective of the visual orientation system 114 will be described, according to an illustrative embodiment. The method 300 will be described as being performed by the visual orientation system 114 with reference to FIGS. 1 and 3.

The method 300 begins and proceeds to operation 302, where the visual orientation system 114 receives the message generated by the user device 108 at operation 210 of the method 200 described above. From operation 302, the method 300 proceeds to operation 304, where the visual orientation system 114 determines the estimated field-of-view of the user 110 based upon the orientation and the location of the user device 108 at time $T_x$ and a potential field-of-view of the user 110. The potential field-of-view of the user 110 is the visual field that the user 110 is physically capable of viewing when unobstructed. The potential field-of-view may be obtained from the customer data 139 stored in the store database 134 or may be included by the user device 108 in the message received at operation 302. Using the orientation and the location of the user device 108 and the potential field-of-view of the user 110, the visual orientation system 114 can return one or more items located within that location of the store premises 102 and estimated to be visible to the user 110 based upon the orientation of the user device 108 (i.e., which direction the user 110 is facing) and area viewable to the user 110 based upon the user's potential field-of-view.

From operation 304, the method 300 proceeds to operation 306, where the visual orientation system 114 generates a query directed to the store database 134. The query can include a request to look-up items located within the estimated field-of-view of the user 110. From operation 306, the method 300 proceeds to operation 308, where the visual orientation system 114 receives a query response from the store database 134. The query response can include one or more items that are located within the estimated field-of-view of the user 110. From operation 308, the method 300 proceeds to operation 310, where the visual orientation system 114 notifies the store analytics system 128 of the one or more items located within the estimated field-of-view of the user 110.

The one or more items located within the estimated field-of-view of the user 110, alone or in aggregate with other estimated fields-of-view, can be used by the store analytics system 128 for analysis to determine what items customers are viewing, how long customers are viewing those items, and whether advertisements for customers translated into sales, among other metrics that may be useable by an owner and/or operator of the store premises 102, an item manufacturer, an item distributor, an item advertiser, and/or other entities. Metrics such as those described above may be used by an owner and/or operator of the store premises 102, an item manufacturer, an item distributor, an item advertiser, and/or other entities for item placement decisions, marketing strategies, events, sales performance analysis, and other uses. For instance, a store operator may be able to make determinations about which products or which locations within the store premises 102 get more, or less, "eyeball traffic." With such analytics intelligence, the store operator may be able to upsell item distributors to purchase higher priced shelf space or shelf space in a different location that is nearby other complementary merchandise. Also, the store analytics system 128 may produce data that indicates which products on a user's 110 visual periphery are more likely to have been seen based on the period of time the user 110 spent at that location.

From operation 310, the method 300 proceeds to operation 312. The method 300 ends at operation 312.

Figure 4:
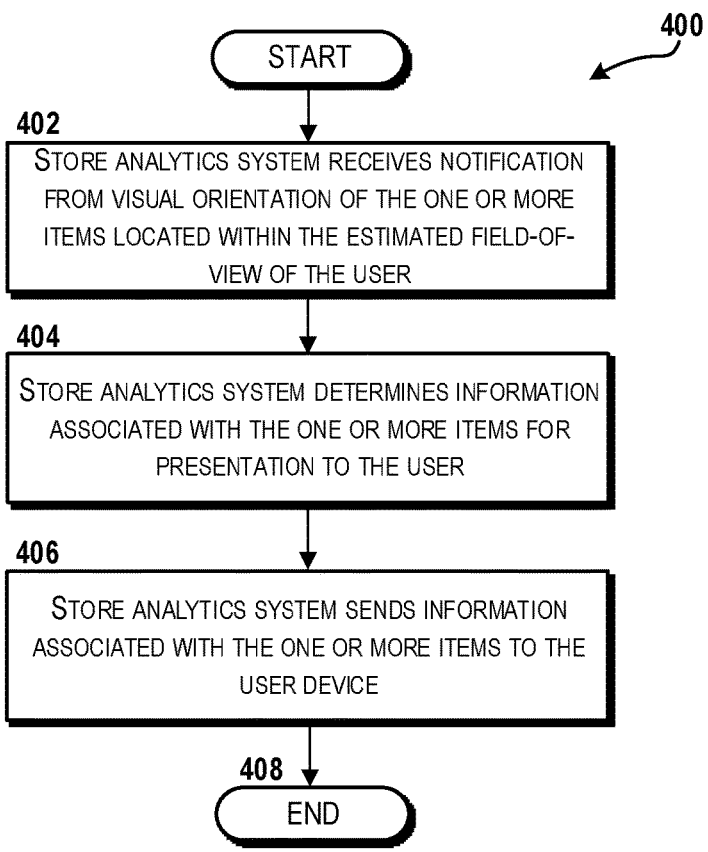
FIG. 4 is a flow diagram illustrating aspects of a method for determining an estimated field-of-view of a user from the perspective of a store analytics system, according to an illustrative embodiment.

Turning now to FIG. 4, a method 400 for determining an estimated field-of-view of the user 110 from the perspective of the store analytics system 128 will be described, according to an illustrative embodiment. The method 400 will be described as being performed by the store analytics system 128 with reference to FIGS. 1 and 4.

The method 400 begins and proceeds to operation 402, where the store analytics system 128 receives the notification from the visual orientation system 114. From operation 402, the method 400 proceeds to operation 404, where the store analytics system 128 determines information associated with the one or more items for presentation to the user 110. From operation 404, the method 400 proceeds to operation 406, where the store analytics system 128 sends the information associated with the one or more items to the user device 108.

In some embodiments, the information includes additional information about the item(s) estimated by the visual orientation system 114 to be within the actual field-of-view 112 of the user 110. The additional information can include, for example, any of the product data 142 associated with the item(s) estimated by the visual orientation system 114 to be within the actual field-of-view 112 of the user 110. Or, the additional information can include, for example, any of the product data 142 associated with the complementary or competing item(s) estimated by the visual orientation system 114 to be within the actual field-of-view 112 of the user 110. In addition, or in the alternative, the additional information can include, for example, any of the advertisement data 144 associated with the item(s) estimated by the visual orientation system 114 to be within the actual field-of-view 112 of the user 110.

In some other embodiments, the information includes customer service information regarding the item(s) estimated by the visual orientation system 114 to be within the actual field-of-view 112 of the user 110. In this manner, customer service personnel can offer, via text, audio and/or video communications established via the store network 126, to assist the user 110 with the item(s) estimated by the visual orientation system 114 to be within the actual field-of-view 112 of the user 110. The customer service personnel may be real or virtual. The customer service personnel may be located within the store premises 102 or remote.

From operation 406, the method 400 proceeds to operation 408. The method 400 ends at operation 408.

Figure 5:
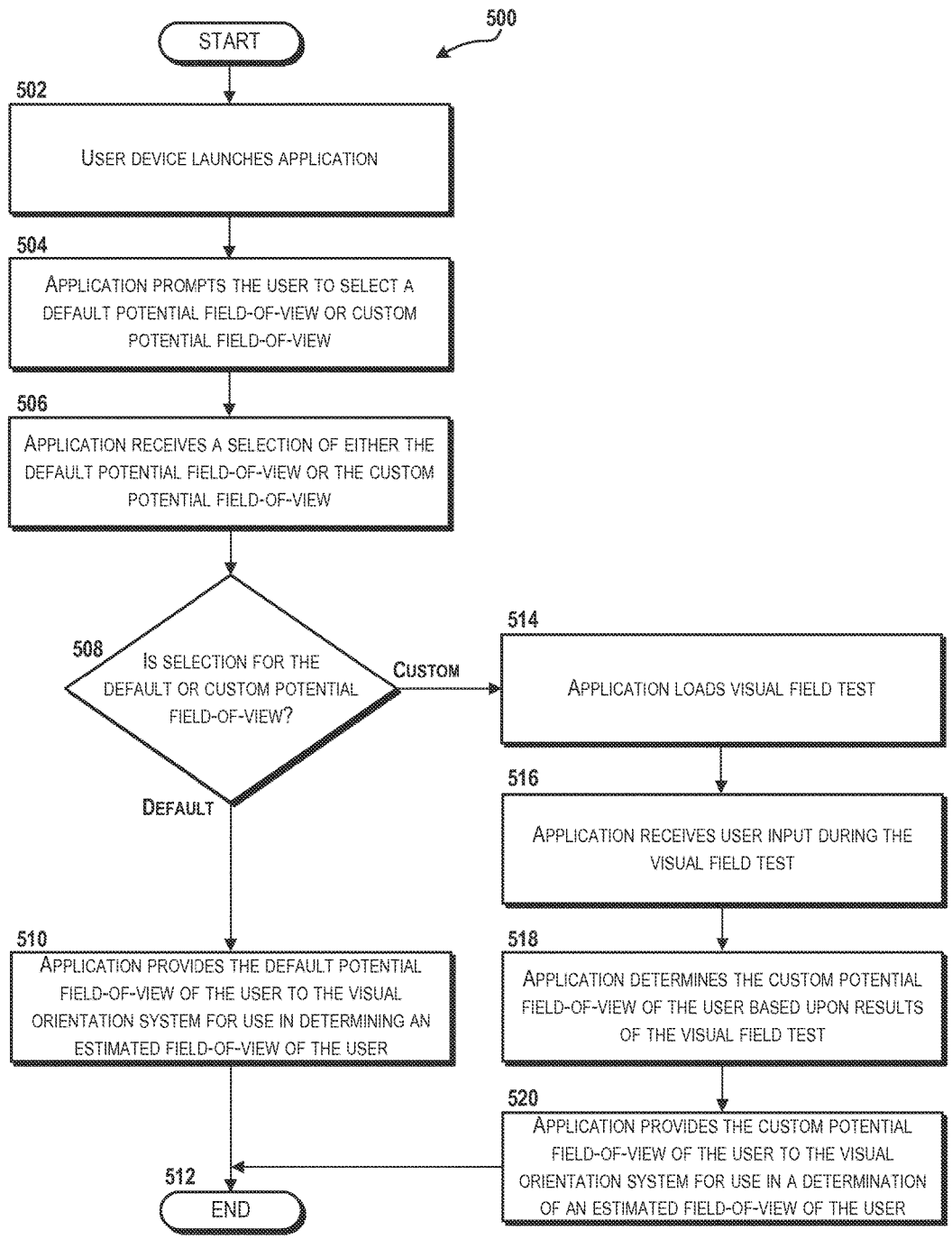
FIG. 5 is a flow diagram illustrating aspects of a method for establishing a potential field-of-view of a user, according to an illustrative embodiment.

Turning now to FIG. 5, a method 500 for establishing a potential field-of-view of the user 110 will be described, according to an illustrative embodiment. The method 500 will be described from the perspective of the user device 108 executing, via one or more processors, the device application 116. The method 500 begins and proceeds to operation 502, where the user device 108 launches the device application 116.

From operation 502, the method 500 proceeds to operation 504, where the device application 116 prompts the user 110 to select a default potential field-of-view or a custom potential field-of-view to be used by the visual orientation system 114 for determining which item(s), if any, are visible to the user 110 for a given location and orientation within the store premises 102. From operation 504, the method 500 proceeds to operation 506, where the device application 116 receives a selection of either the default potential field-of-view or the custom potential field-of-view. From operation 506, the method 500 proceeds to operation 508, where the device application 116 determines whether the selection received at operation 506 is for the default potential field-of-view or for the custom potential field-of-view.

If, at operation 508, the device application 116 determines that the selection received at operation 506 is for the default potential field-of-view, the method 500 proceeds from operation 508 to operation 510. At operation 510, the device application 116 provides the default potential field-of-view of the user 110 to the visual orientation system 114 for use in determining an estimated field-of-view of the user 110.

The default potential field-of-view can be defined as a normal visual field. In some embodiments, the normal visual field is defined in accordance with optometry and ophthalmology standards for the normal human visual field, and as such, may be updated from time-to-time. For example, the normal human visual field is defined as an island of vision measuring 90 degrees temporally to central fixation, 50 degrees superiorly and nasally, and 60 degrees inferiorly. Likewise, an abnormal field of vision may be defined as a depression or absence of vision anywhere in the island of vision. The user 110 may select the default potential field-of-view if he or she knows, based upon a vision assessment, that his or her visual field is normal. The user 110 may select the default potential field-of-view if he or she does not want to customize his or her potential field-of-view with the understanding that the visual orientation system 114 may therefore determine which item(s), if any, are visible to the user 110 for a given location and orientation within the store premises 102 with decreased accuracy. In some embodiments, the visual orientation system 114 can determine the estimated field-of-view of the user 110 based upon the location and orientation of the user device 108, without the potential field of view.

From operation 510, the method 500 proceeds to operation 512. The method 500 ends at operation 512.

If, at operation 508, the device application 116 determines that the selection received at operation 506 is for the custom potential field-of-view, the method 500 proceeds from operation 508 to operation 514. At operation 514, the device application 116 loads a visual field test. The visual field test, in some embodiments, is a standardized visual field test utilized by optometrists and ophthalmologists to determine a patient's visual field that has been optimized for use on the user device 108. For example, the visual field test may utilize a software-based multi-fixation campimeter, such as a version of or the Damato Multi-Fixation Campimeter available from www.testvision.org.

In some embodiments, the visual field test is included as part of the device application 116. In some other embodiments, the visual field test is available via a website accessible by a web browser installed on the user device 108. In some other embodiments, the visual field test is available via a web application accessible by the web browser. In some other embodiments, the visual field test is included in another application installed on the user device 108. The remaining operations of the method 500 will be described in accordance with an embodiment in which the visual field test is included as part of the device application 116.

From operation 514, the method 500 proceeds to operation 516, where the device application 116 receives user input during the visual field test. From operation 516, the method 500 proceeds to operation 518, where the device application 116 determines the custom potential field-of-view of the user 110 based upon results of the visual field test. For example, the results of the visual field test may reveal blind spots and/or other abnormalities of the visual field of the user 110. These abnormalities can be considered in determining the potential field-of-view of the user 110. As such, different users may have different custom potential field-of-views and therefore may affect which, if any, items each user may see when viewing an area of the store premises 102 from the same location and orientation. From operation 518, the method 500 proceeds to operation 520, where the device application 116 provides the custom potential field-of-view of the user 110 to the visual orientation system 114 for use by the visual orientation system 114 in a determination of the estimated field-of-view of the user 110.

From operation 520, the method 500 proceeds to operation 512. The method 500 ends at operation 512.

Figure 6:
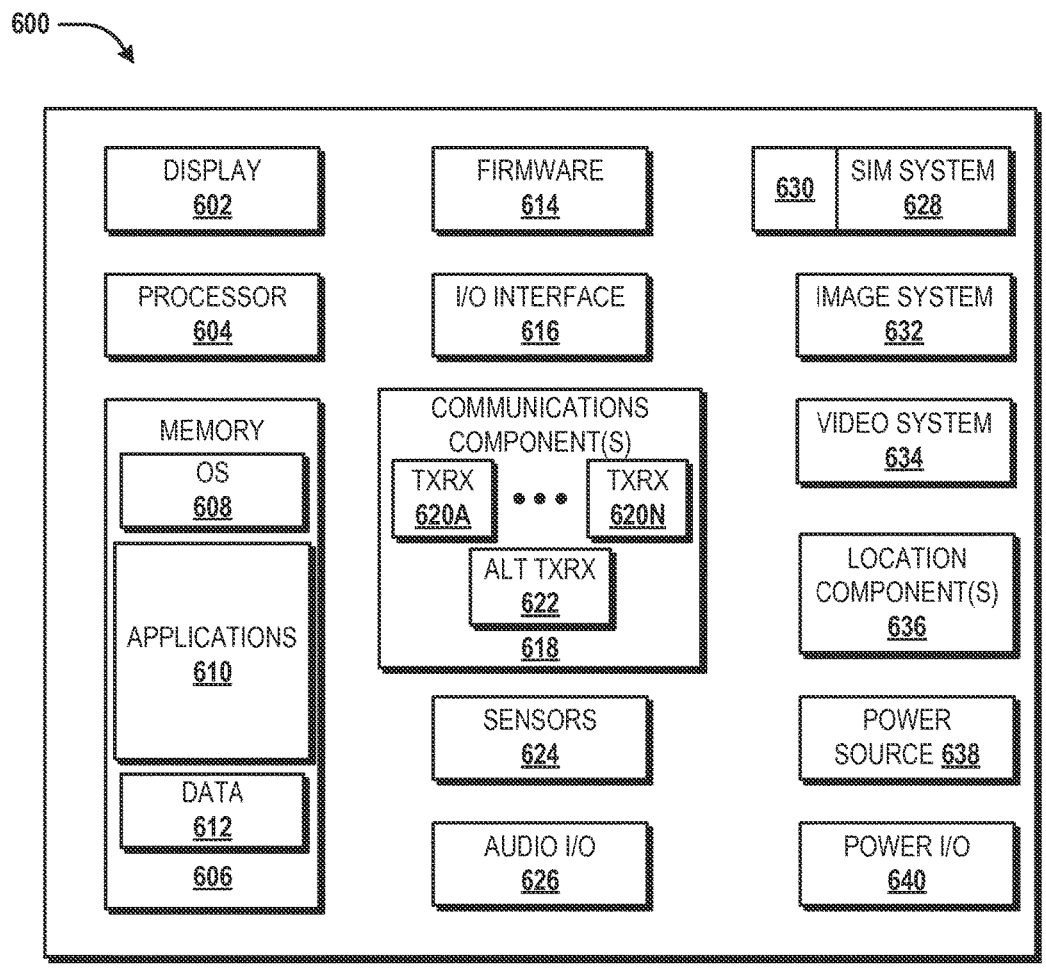
FIG. 6 schematically illustrates a network, according to an illustrative embodiment.

Turning now to FIG. 6, an illustrative mobile device 600 and components thereof will be described. In some embodiments, the user device 108 described above, in part, with reference to FIG. 1 can be configured as and/or can have an architecture similar or identical to the mobile device 600 described herein with respect to FIG. 6. It should be understood, however, that the user device 108 may or may not include the functionality described herein with reference to FIG. 6. While connections are not shown between the various components illustrated in FIG. 6, it should be understood that some, none, or all of the components illustrated in FIG. 6 can be configured to interact with one other to carry out various device functions. In some embodiments, the components are arranged so as to communicate via one or more busses (not shown). Thus, it should be understood that FIG. 6 and the following description are intended to provide a general understanding of a suitable environment in which various aspects of embodiments can be implemented, and should not be construed as being limiting in any way.

As illustrated in FIG. 6, the mobile device 600 can include a display 602 for displaying data. According to various embodiments, the display 602 can be configured to display at least a portion of the customer data 139, at least a portion of the store data 141, at least a portion of the product data 142, at least a portion of the advertisement data 144, various graphical user interface ("GUI") elements, text, images, video, virtual keypads and/or keyboards, messaging data, notification messages, metadata, internet content, device status, time, date, calendar data, device preferences, map and location data, customer service interactions, combinations thereof, and the like. The mobile device 600 also can include a processor 604 and a memory or other data storage device ("memory") 606. The processor 604 can be configured to process data and/or can execute computer-executable instructions stored in the memory 606. The computer-executable instructions executed by the processor 604 can include, for example, an operating system 608, one or more applications 610 such as the device application 116, other computer-executable instructions stored in a memory 606, or the like. In some embodiments, the applications 610 also can include a UI application (not illustrated in FIG. 6).

The UI application can interface with the operating system 608 to facilitate user interaction with functionality and/or data stored at the mobile device 600 and/or stored elsewhere, such as in the store database 134. In some embodiments, the operating system 608 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 604 to aid a user in interacting with at least a portion of the customer data 139, at least a portion of the store data 141, at least a portion of the product data 142, at least a portion of the advertisement data 144, and/or other data associated with the store premises 102, the user device 108, the network 122, the network location system 124, the store analytics system 128, the store location system 130, the visual orientation system 114, the store database 134, and/or the other device and/or systems not specifically described herein. The UI application can be executed by the processor 604 to aid a user in answering/initiating calls, entering/deleting other data, entering and setting user IDs and passwords for device access, configuring settings, manipulating address book content and/or settings, multimode interaction, interacting with other applications 610, and otherwise facilitating user interaction with the operating system 608, the applications 610, and/or other types or instances of data 612 that can be stored at the mobile device 600.

According to various embodiments, the applications 610 can include, for example, the device application 116, a visual field test application, a web browser application, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 610, the data 612, and/or portions thereof can be stored in the memory 606 and/or in a firmware 614, and can be executed by the processor 604. The firmware 614 also can store code for execution during device power up and power down operations. It should be appreciated that the firmware 614 can be stored in a volatile or non-volatile data storage device including, but not limited to, the memory 606 and/or a portion thereof.

The mobile device 600 also can include an input/output ("I/O") interface 616. The I/O interface 616 can be configured to support the input/output of data. In some embodiments, the I/O interface 616 can include a hardwire connection such as a universal serial bus ("USB") port, a mini-USB port, a micro-USB port, an audio jack, a PS2 port, an IEEE 1394 ("FIREWIRE") port, a serial port, a parallel port, an Ethernet (RJ45) port, an RJ11 port, a proprietary port, combinations thereof, or the like. In some embodiments, the mobile device 600 can be configured to synchronize with another device to transfer content to and/or from the mobile device 600. In some embodiments, the mobile device 600 can be configured to receive updates to one or more of the applications 610 via the I/O interface 616, though this is not necessarily the case. In some embodiments, the I/O interface 616 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 616 may be used for communications between the mobile device 600 and a network device or local device.

The mobile device 600 also can include a communications component 618. The communications component 618 can be configured to interface with the processor 604 to facilitate wired and/or wireless communications with one or more networks, such as the network 122 and the store network 126, and one or more of the plurality of beacons 106A-106D. In some embodiments, the communications component 618 includes a multimode communications subsystem for facilitating communications via the cellular network and one or more other networks.

The communications component 618, in some embodiments, includes one or more transceivers. The one or more transceivers, if included, can be configured to communicate over the same and/or different wireless technology standards with respect to one another. For example, in some embodiments one or more of the transceivers of the communications component 618 may be configured to communicate using GSM, CDMAONE, CDMA2000, LTE, and various other 2G, 2.5G, 3G, 4G, and greater generation technology standards. Moreover, the communications component 618 may facilitate communications over various channel access methods (which may or may not be used by the aforementioned standards) including, but not limited to, TDMA, FDMA, W-CDMA, OFDM, SDMA, and the like.

In addition, the communications component 618 may facilitate data communications using GPRS, EDGE, the HSPA protocol family including HSDPA, EUL or otherwise termed HSUPA, HSPA+, and various other current and future wireless data access standards. In the illustrated embodiment, the communications component 618 can include a first transceiver ("TxRx") 620A that can operate in a first communications mode (e.g., GSM). The communications component 618 also can include an N$^{th}$ transceiver ("TxRx") 620N that can operate in a second communications mode relative to the first transceiver 620A (e.g., UMTS). While two transceivers 620A-N (hereinafter collectively and/or generically referred to as "transceivers 620") are shown in FIG. 6, it should be appreciated that less than two, two, or more than two transceivers 620 can be included in the communications component 618.

The communications component 618 also can include an alternative transceiver ("Alt TxRx") 622 for supporting other types and/or standards of communications. According to various contemplated embodiments, the alternative transceiver 622 can communicate using various communications technologies such as, for example, WI-FI, WIMAX, BLUETOOTH, BLE, infrared, infrared data association ("IRDA"), near field communications ("NFC"), other RF technologies, combinations thereof, and the like. As such, the alternative transceiver 622 facilitates communications with one or more of the plurality of beacons 106A-106D.

In some embodiments, the communications component 618 also can facilitate reception from terrestrial radio networks, digital satellite radio networks, internet-based radio service networks, combinations thereof, and the like. The communications component 618 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 600 also can include one or more sensors 624. The sensors 624 can include temperature sensors, light sensors, air quality sensors, movement sensors, orientation sensors (e.g., the orientation sensor(s) 118 shown in FIG. 1), noise sensors, proximity sensors, or the like. As such, it should be understood that the sensors 624 can include, but are not limited to, accelerometers, magnetometers, gyroscopes, infrared sensors, noise sensors, microphones, combinations thereof, or the like. One or more of the sensors 624 can be used to detect movement of the mobile device 600. Additionally, audio capabilities for the mobile device 600 may be provided by an audio I/O component 626. The audio I/O component 626 of the mobile device 600 can include one or more speakers for the output of audio signals, one or more microphones for the collection and/or input of audio signals, and/or other audio input and/or output devices.

The illustrated mobile device 600 also can include a subscriber identity module ("SIM") system 628. The SIM system 628 can include a universal SIM ("USIM"), a universal integrated circuit card ("UICC") and/or other identity devices. The SIM system 628 can include and/or can be connected to or inserted into an interface such as a slot interface 630. In some embodiments, the slot interface 630 can be configured to accept insertion of other identity cards or modules for accessing various types of networks. Additionally, or alternatively, the slot interface 630 can be configured to accept multiple subscriber identity cards. Because other devices and/or modules for identifying users and/or the mobile device 600 are contemplated, it should be understood that these embodiments are illustrative, and should not be construed as being limiting in any way.

The mobile device 600 also can include an image capture and processing system 632 ("image system"). The image system 632 can be configured to capture or otherwise obtain photos, videos, and/or other visual information. As such, the image system 632 can include cameras, lenses, charge-coupled devices ("CCDs"), combinations thereof, or the like. The mobile device 600 may also include a video system 634. The video system 634 can be configured to capture, process, record, modify, and/or store video content. Photos and videos obtained using the image system 632 and the video system 634, respectively, may be added as message content to an MMS message, email message, and sent to another mobile device. The video and/or photo content also can be shared with other devices via various types of data transfers via wired and/or wireless communication devices as described herein.

The mobile device 600 also can include one or more location components 636 (e.g., the location component(s) 120 described above with reference to FIG. 1). The location components 636 can be configured to send and/or receive signals to determine a location of the mobile device 600. According to various embodiments, the location components 636 can send and/or receive signals from GPS devices, assisted-GPS ("A-GPS") devices, WI-FI/WIMAX and/or cellular network triangulation data, combinations thereof, and the like. The location component 636 also can be configured to communicate with the communications component 618 to retrieve triangulation data for determining a location of the mobile device 600. In some embodiments, the location component 636 can interface with cellular network nodes, telephone lines, satellites, location transmitters and/or beacons, wireless network transmitters and receivers, combinations thereof, and the like. In some embodiments, the location component 636 can include and/or can communicate with one or more of the sensors 624 such as a compass, an accelerometer, and/or a gyroscope to determine the orientation of the mobile device 600. Using the location component 636, the mobile device 600 can generate and/or receive data to identify its geographic location, or to transmit data used by other devices to determine the location of the mobile device 600. The location component 636 may include multiple components for determining the location and/or orientation of the mobile device 600.

The illustrated mobile device 600 also can include a power source 638. The power source 638 can include one or more batteries, power supplies, power cells, and/or other power subsystems including alternating current ("AC") and/or direct current ("DC") power devices. The power source 638 also can interface with an external power system or charging equipment via a power I/O component 640. Because the mobile device 600 can include additional and/or alternative components, the above embodiment should be understood as being illustrative of one possible operating environment for various embodiments of the concepts and technologies described herein. The described embodiment of the mobile device 600 is illustrative, and should not be construed as being limiting in any way.

Figure 7:
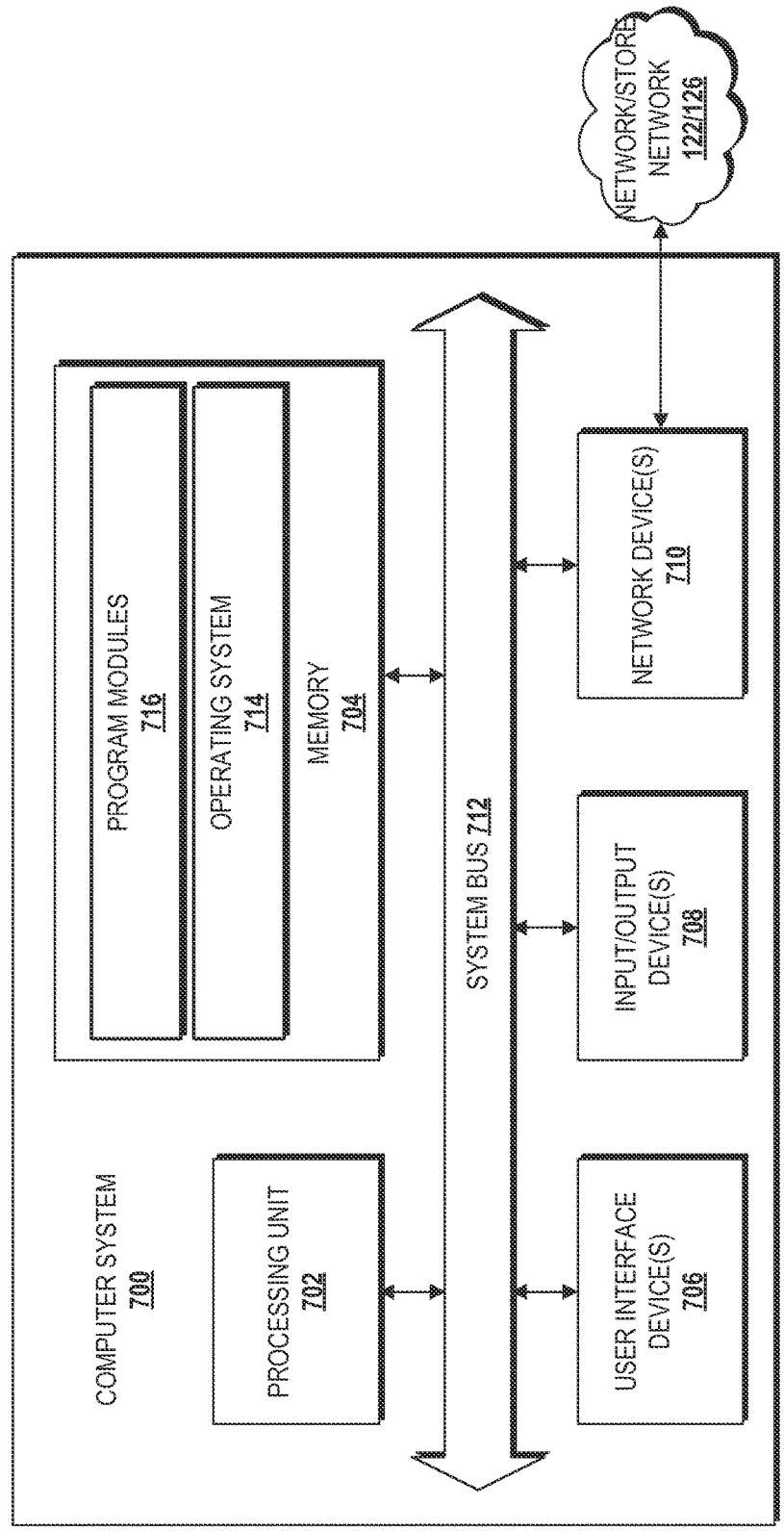
FIG. 7 is a block diagram illustrating an example computer system, according to some illustrative embodiments.

FIG. 7 is a block diagram illustrating a computer system 700 configured to provide the functionality described herein in accordance with various embodiments of the concepts and technologies disclosed herein. In some embodiments, the user device 108, the store analytics system 128, the store location system 130, and/or the visual orientation system 114, can be configured as and/or can have an architecture similar or identical to the computer system 700 described herein with respect to FIG. 7. It should be understood, however, that the user device 108, the store analytics system 128, the store location system 130, and/or the visual orientation system 114 may or may not include the functionality described herein with reference to FIG. 7.

The computer system 700 includes a processing unit 702, a memory 704, one or more user interface devices 706, one or more input/output ("I/O") devices 708, and one or more network devices 710, each of which is operatively connected to a system bus 712. The bus 712 enables bi-directional communication between the processing unit 702, the memory 704, the user interface devices 706, the I/O devices 708, and the network devices 710.

The processing unit 702 may be a standard central processor that performs arithmetic and logical operations, a more specific purpose programmable logic controller ("PLC"), a programmable gate array, or other type of processor known to those skilled in the art and suitable for controlling the operation of the computer system 700. Processing units are generally known, and therefore are not described in further detail herein.

The memory 704 communicates with the processing unit 702 via the system bus 712. In some embodiments, the memory 704 is operatively connected to a memory controller (not shown) that enables communication with the processing unit 702 via the system bus 712. The memory 704 includes an operating system 714 and one or more program modules 716. The operating system 714 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, and/or iOS families of operating systems from APPLE CORPORATION, the FREEBSD family of operating systems, the SOLARIS family of operating systems from ORACLE CORPORATION, other operating systems, and the like.

The program modules 716 may include various software and/or program modules described herein. In some embodiments, for example, the program modules 716 include the device application 116, the store analytics application 136, the store location application 138, or the visual orientation application 140. The device application 116, the store analytics application 136, the store location application 138, the visual orientation application 140, and/or other software programs can be embodied in computer-readable media containing instructions that, when executed by the processing unit 702, perform at least a portion of one or more of the methods 200, 300, 400, 500 described in detail above with respect to FIGS. 2-5. According to embodiments, the program modules 716 may be embodied in hardware, software, firmware, or any combination thereof. Although not shown in FIG. 7, it should be understood that the memory 704 also can be configured to store all or a portion of the store database 134 and/or other data, if desired.

By way of example, and not limitation, computer-readable media may include any available computer storage media or communication media that can be accessed by the computer system 700. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 700. In the claims, the phrase "computer storage medium" and variations thereof does not include waves or signals per se and/or communication media.

The user interface devices 706 may include one or more devices with which a user accesses the computer system 700. The user interface devices 706 may include, but are not limited to, computers, servers, personal digital assistants, cellular phones, or any suitable computing devices. The I/O devices 708 enable a user to interface with the program modules 716. In one embodiment, the I/O devices 708 are operatively connected to an I/O controller (not shown) that enables communication with the processing unit 702 via the system bus 712. The I/O devices 708 may include one or more input devices, such as, but not limited to, a keyboard, a mouse, or an electronic stylus. Further, the I/O devices 708 may include one or more output devices, such as, but not limited to, a display screen or a printer to output data such as the data stored in the store database 134 in the form of text, numbers, characters, maps, other visualizations, and the like.

The network devices 710 enable the computer system 700 to communicate with other networks or remote systems via one or more networks such as the network 122 and/or the store network 126. Examples of the network devices 710 include, but are not limited to, a modem, a radio frequency ("RF") or infrared ("IR") transceiver, a telephonic interface, a bridge, a router, or a network card. The network 122, 126 may include a wireless network such as, but not limited to, a WLAN such as a WI-FI network, a WWAN, a Wireless Personal Area Network ("WPAN") such as BLUETOOTH, a WMAN such a WiMAX network, or a cellular network. Alternatively, the network 122, 126 may be a wired network such as, but not limited to, a WAN such as the Internet, a LAN, a wired PAN, or a wired MAN.

Figure 8:
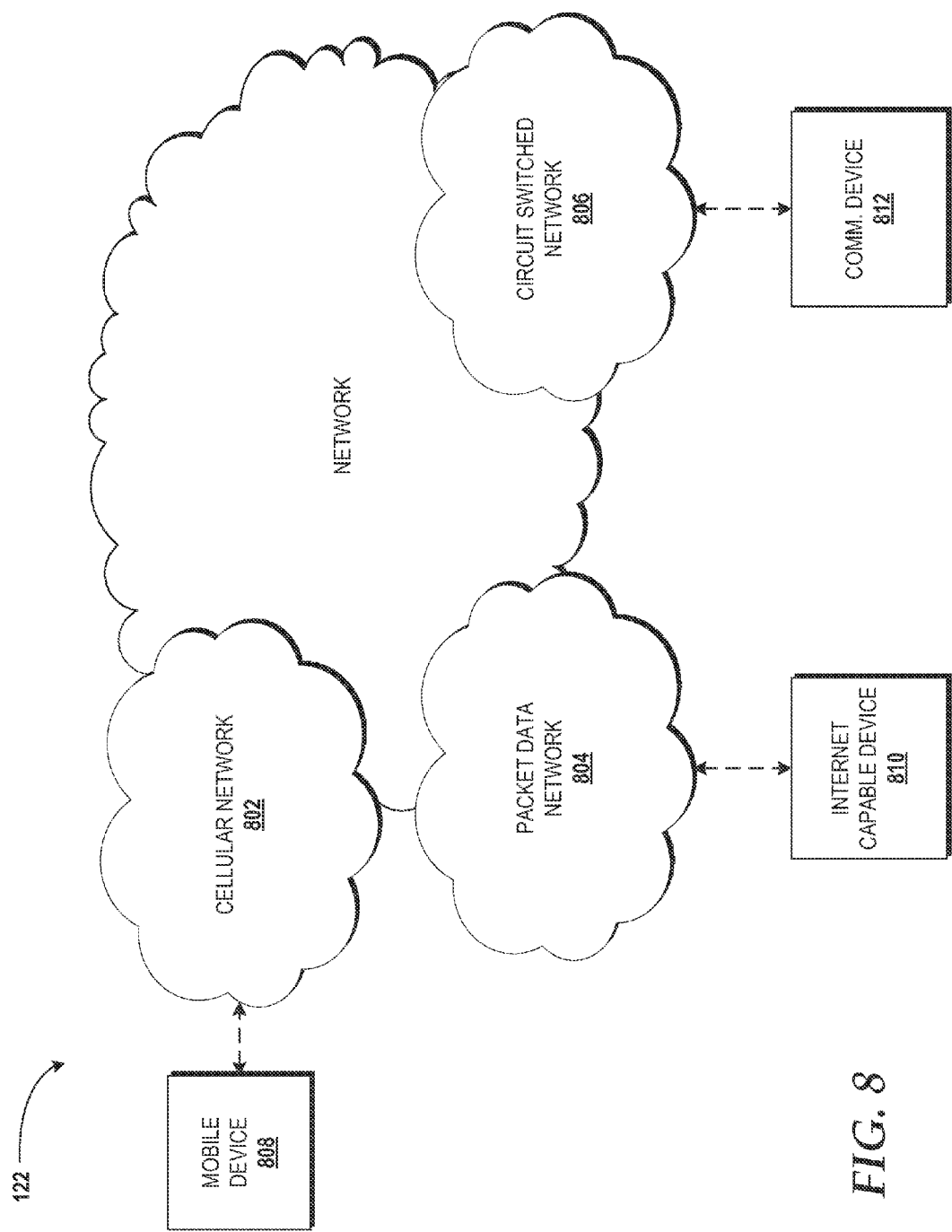
FIG. 8 is a block diagram illustrating an example mobile device, according to some illustrative embodiments.

Turning now to FIG. 8, additional details of an embodiment of the network 122 are illustrated, according to an illustrative embodiment. The network 122 includes a cellular network 802, a packet data network 804, for example, the Internet, and a circuit switched network 806, for example, a publicly switched telephone network ("PSTN"). The cellular network 802 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like.

The cellular network 802 also includes radios and nodes for receiving and transmitting voice, data, and combinations thereof to and from radio transceivers, networks, the packet data network 804, and the circuit switched network 806.

A mobile communications device 808, such as, for example, the user device 108, a cellular telephone, a user equipment, a mobile terminal, a PDA, a laptop computer, a handheld computer, and combinations thereof, can be operatively connected to the cellular network 802. The cellular network 802 can be configured as a 2G GSM network and can provide data communications via GPRS and/or EDGE. Additionally, or alternatively, the cellular network 802 can be configured as a 3G UMTS network and can provide data communications via the HSPA protocol family, for example, HSDPA, EUL (also referred to as HSUPA), and HSPA+. The cellular network 802 also is compatible with 4G mobile communications standards as well as evolved and future mobile standards.

The packet data network 804 includes various devices, for example, servers, computers, databases, and other devices in communication with another, as is generally known. The packet data network 804 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 804 includes or is in communication with the Internet. The circuit switched network 806 includes various hardware and software for providing circuit switched communications. The circuit switched network 806 may include, or may be, what is often referred to as a plain old telephone system ("POTS"). The functionality of a circuit switched network 806 or other circuit-switched network are generally known and will not be described herein in detail.

The illustrated cellular network 802 is shown in communication with the packet data network 804 and a circuit switched network 806, though it should be appreciated that this is not necessarily the case. One or more Internet-capable devices 88, for example, a personal computer ("PC"), a laptop, a portable device, or another suitable device, can communicate with one or more cellular networks 802, and devices connected thereto, through the packet data network 804. It also should be appreciated that the Internet-capable device 810 can communicate with the packet data network 804 through the circuit switched network 806, the cellular network 802, and/or via other networks (not illustrated).

As illustrated, a communications device 812, for example, a telephone, facsimile machine, modem, computer, or the like, can be in communication with the circuit switched network 806, and therethrough to the packet data network 804 and/or the cellular network 802. It should be appreciated that the communications device 812 can be an Internet-capable device, and can be substantially similar to the Internet-capable device 810. In the specification, the network 122 may be used to refer broadly to any combination of the networks 802, 804, 806. It should be appreciated that substantially all of the functionality described with reference to the network 122 can be performed by the cellular network 802, the packet data network 804, and/or the circuit switched network 806, alone or in combination with other networks, network elements, and the like.

Figure 9:
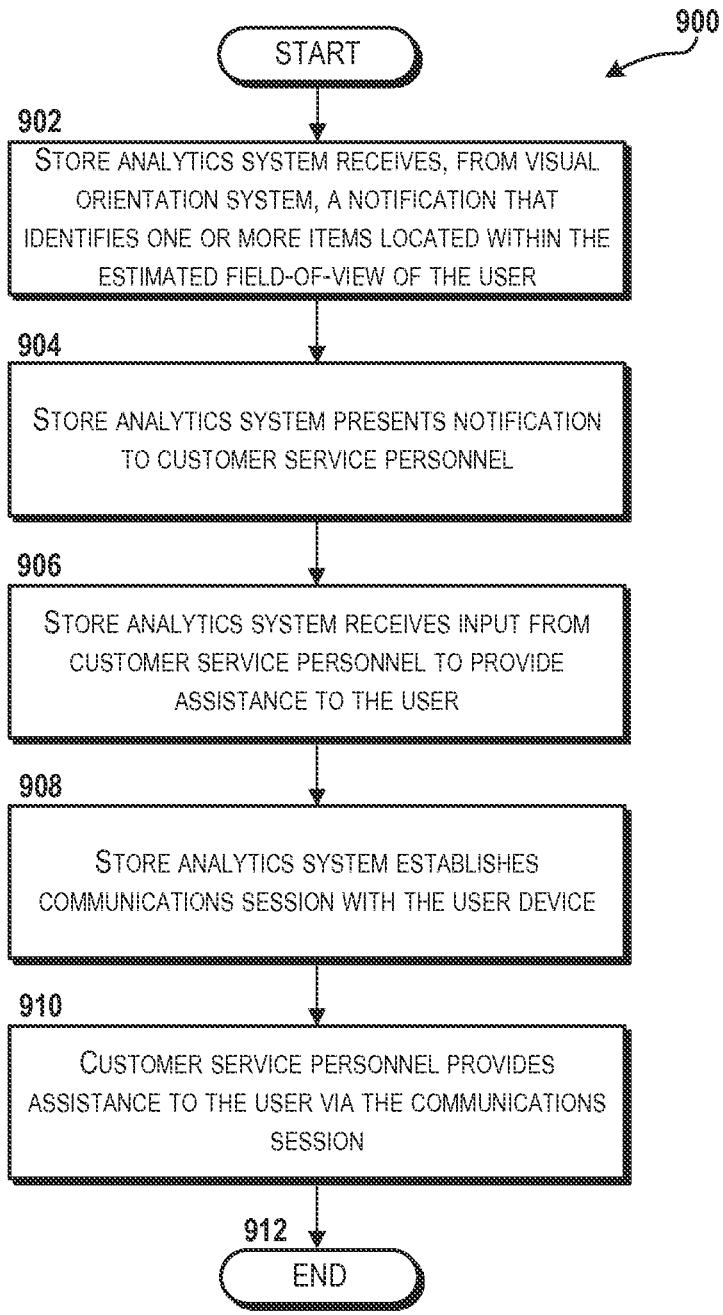
FIG. 9 is a block diagram illustrating aspects of a method for using an estimated field-of-view of a user to provide customer service, according to an illustrative embodiment.

Turning now to FIG. 9, a method 900 for using an estimated field-of-view of the user 110 to provide customer service will be described, according to an illustrative embodiment. The method 900 begins and proceeds to operation 902, where the store analytics system 128 receives a notification from the visual orientation system 114. The notification can identify one or more items within an estimated field-of-view of the user 110. From operation 902, the method 900 proceeds to operation 904, where the store analytics system 128 presents the notification to one or more customer service personnel.

From operation 904, the method 900 proceeds to operation 906, where the store analytics system 128 receives input from the customer service personnel to provide assistance to the user 110. In response, at operation 908, the store analytics system 128 establishes a communications session with the user device 108 over the store network 126 and/or the network 122, for example. The communications session may be a text-based chat session, a voice session (e.g., VoIP), a video session, or other session by which the customer service personnel can communicate with the user 110 to provide assistance with regards to any of the one or more items within the estimated field-of-view of the user 110.

From operation 908, the method 900 proceeds to operation 910, where the customer service personnel provides assistance to the user 110 via the communications session. The customer service personnel may assist the user 110 in locating a particular item which may or may not be within the estimated field-of-view. The customer service personnel may assist the user 110 with past, present and/or future promotions associated with any of the one or more items within the estimated field-of-view of the user 110. The customer service personnel may assist the user 110 with selecting one or more of the items within the estimated field-of-view of the user 110 that best suits his or her needs. It should be understood that the aforementioned assistance examples are merely exemplary and should not be construed as being limiting in any way.

From operation 910, the method 900 proceeds to operation 912. The method 900 ends at operation 912.

In some embodiments, the customer service personnel may provide assistance to the user 110 based upon information obtained from the user device 108 that may indicate that the user 110 is having difficulty with some aspects of his or her shopping experience. For example, how long the user 110 maintains the estimated field-of-view may be indicative of the user 110 being unable to locate a particular item or the user 110 is having difficulty deciding which of many items he or she should purchase.

In some other embodiments, the user 110 may provide input to the user device 108 to instruct the user device 108 to initiate the communications session with the store analytics system 128. In these embodiments, the store analytics system 128 may request from the user device 108 orientation and location information for querying the visual orientation system to determine what, if any, items are located within the estimated field-of-view of the user 110 so that the customer service personnel can be aware of what it is the user 110 is currently viewing in order to better assist the user 110.

Based on the foregoing, it should be appreciated that aspects of in-store field-of-view merchandising and analytics have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

What is claimed is:

1. A method comprising:
   receiving, by a system comprising a processor, a message comprising an orientation of a user device and a location of the user device within an environment;
   determining, by the system, based upon the orientation of the user device and the location of the user device, an estimated field-of-view of a user;
   generating, by the system, a query directed to a database, the query comprising a request to look-up items located within the estimated field-of-view of the user within the environment; and
   receiving, by the system, in response to the query, a query response identifying an item located within the estimated field-of-view of the user within the environment.

2. The method of claim 1, further comprising obtaining, by the system, a potential field-of-view of the user associated with the user device; and wherein determining, by the system, the estimated field-of-view of the user comprises determining, by the system, the estimated field-of-view of the user further based upon the potential field-of-view of the user.

3. The method of claim 2, wherein the message further comprises the potential field-of-view of the user; and wherein obtaining, by the system, the potential field-of-view of the user associated with the user device comprises obtaining, by the system, the potential field-of-view of the user associated with the user device from the message.

4. The method of claim 2, wherein obtaining, by the system, the potential field-of-view of the user associated with the user device comprises obtaining, by the system, the potential field-of-view of the user associated with the user device from customer data associated with the user and stored in the database.

5. The method of claim 2, wherein the potential field-of-view comprises a default potential field-of-view or a custom potential field-of-view.

6. The method of claim 1, further comprising:
   notifying a store analytics system of the item located within the estimated field-of-view of the user within the environment; and
   utilizing, by the store analytics system, information regarding the item located within the estimated field-of-view of the user for an aggregate analysis of a plurality of customers of the environment to determine at least one of what items the plurality of customers are viewing within the environment, how long the plurality of customers are viewing the items within the environment, or an effectiveness of an advertisement associated with the items within the environment.

7. The method of claim 6, further comprising:
   determining, by the store analytics system, information associated with the item located within the estimated field-of-view of the user within the environment; and
   sending, by the store analytics system, the information associated with the item located within the estimated field-of-view of the user within the environment to the user device.

8. The method of claim 6, further comprising establishing, by the store analytics system, communications with the user device over a network so that customer service personnel can offer to assist the user with the item.

9. A system comprising:
   a processor; and
   a memory storing computer-executable instructions that, when executed by the processor, cause the processor to perform operations comprising
      receiving a message comprising an orientation of a user device and a location of the user device within an environment,
      determining, by the system, based upon the orientation of the user device, the location of the user device, and a potential field-of-view of the user, an estimated field-of-view of a user, generating a query directed to a database, the query comprising a request to look-up items located within the estimated field-of-view of the user within the environment, and receiving, in response to the query, a query response identifying an item located within the estimated field-of-view of the user within the environment.

10. The system of claim 9, wherein the message further comprises the potential field-of-view of the user.

11. The system of claim 9, wherein the operations further comprise obtaining the potential field-of-view of the user associated with the user device from the message.

12. The system of claim 9, wherein the potential field-of-view comprises a default potential field-of-view or a custom potential field-of-view.

13. The system of claim 12, wherein the custom potential field-of-view is determined based upon results of a visual field test administered to the user.

14. The system of claim 13, wherein the visual field test is administered by an application executed by the user device.

15. A computer storage medium comprising instructions that, when executed by a processor of a system, cause the system to perform operations comprising:

receiving a message comprising an orientation of a user device and a location of the user device within an environment;

determining based upon the orientation of the user device, the location of the user device, and a potential field-of-view of a user, an estimated field-of-view of the user;

generating a query directed to a database, the query comprising a request to look-up items located within the estimated field-of-view of the user within the environment; and receiving, in response to the query, a query response identifying an item located within the estimated field-of-view of the user within the environment.

16. The computer storage medium of claim 15, wherein the message further comprises the potential field-of-view of the user.

17. The computer storage medium of claim 15, wherein the operations further comprise obtaining the potential field-of-view of the user associated with the user device from the message.

18. The computer storage medium of claim 15, wherein the potential field-of-view comprises a default potential field-of-view or a custom potential field-of-view.

19. The computer storage medium of claim 18, wherein the custom potential field-of-view is determined based upon results of a visual field test administered to the user.

20. The computer storage medium of claim 19, wherein the visual field test is administered by an application executed by the user device.

* * * * *